(12) United States Patent
Heo et al.

(10) Patent No.: US 12,173,117 B2
(45) Date of Patent: Dec. 24, 2024

(54) POLYESTER RESIN COMPOSITION, POLYESTER FILM, AND LAMINATE FOR ELECTRONIC DEVICE

(71) Applicant: SK microworks Co., Ltd., Suwon-si (KR)

(72) Inventors: Young Min Heo, Suwon-si (KR); Jewon Yeon, Suwon-si (KR); Byeong Jae Lim, Suwon-si (KR)

(73) Assignee: SK microworks Co., Ltd., Suwon-si (KR)

( * ) Notice: Subject to any disclaimer, the term of this patent is extended or adjusted under 35 U.S.C. 154(b) by 0 days.

(21) Appl. No.: 17/844,875

(22) Filed: Jun. 21, 2022

(65) Prior Publication Data

US 2022/0411575 A1  Dec. 29, 2022

(30) Foreign Application Priority Data

Jun. 29, 2021 (KR) .................. 10-2021-0084559

(51) Int. Cl.
| | | |
|---|---|---|
| *C08G 63/199* | (2006.01) | |
| *C08K 5/11* | (2006.01) | |
| *C08K 5/372* | (2006.01) | |
| *C08K 5/5357* | (2006.01) | |

(52) U.S. Cl.
CPC ............ *C08G 63/199* (2013.01); *C08K 5/11* (2013.01); *C08K 5/372* (2013.01); *C08K 5/5357* (2013.01)

(58) Field of Classification Search
CPC ........ C08G 63/199; C08K 5/11; C08K 5/372; C08K 5/5357
See application file for complete search history.

(56) References Cited

U.S. PATENT DOCUMENTS

| | | | |
|---|---|---|---|
| 2020/0157342 A1 | 5/2020 | Young et al. | |
| 2022/0411575 A1 | 12/2022 | Heo et al. | |

FOREIGN PATENT DOCUMENTS

| | | | | |
|---|---|---|---|---|
| CN | 101945946 A | | 1/2011 | |
| CN | 106588991 A | * | 4/2017 | .......... C07F 9/65746 |
| CN | 108350257 A | | 7/2018 | |
| CN | 108352435 A | | 7/2018 | |
| CN | 111433262 A | | 7/2020 | |
| CN | 112912442 A | | 6/2021 | |
| JP | H02-500033 A | | 1/1990 | |
| JP | 06116408 A1 | * | 4/1994 | ............... C08J 5/04 |
| JP | 2008-7621 A | | 1/2008 | |
| JP | 2008-143962 A | | 6/2008 | |
| JP | 2011026484 A | * | 2/2011 | ............... C08J 5/18 |
| JP | WO2012029760 A1 | * | 10/2013 | ............... C08J 5/18 |
| JP | 2020-38820 A | | 3/2020 | |
| JP | 2022-54462 A | | 4/2022 | |
| KR | 10-2009-0041974 A | | 4/2009 | |
| KR | 10-1275159 B1 | | 6/2013 | |
| KR | 10-2019-0059216 A | | 5/2019 | |
| KR | 10-1976501 B1 | | 5/2019 | |
| KR | 10-2094283 B1 | | 3/2020 | |
| TW | 201223995 A1 | | 6/2012 | |
| WO | WO 88/01285 A1 | | 2/1988 | |
| WO | WO 2010/140611 A1 | | 12/2010 | |
| WO | WO 2012/029760 A1 | | 3/2012 | |
| WO | WO-2019018340 A1 | * | 1/2019 | ............... C08K 5/13 |

OTHER PUBLICATIONS

English machine translation of JPWO 2012029760A1 (Year: 2012).*
English machine translation JP 06116408A1 (Year: 1994).*
English machine translation of CN 106588991A (Year: 2017).*
English machine translation of JP 2011-026484A (Year: 2011).*

* cited by examiner

*Primary Examiner* — John E Uselding
(74) *Attorney, Agent, or Firm* — NSIP Law

(57) ABSTRACT

The present disclosure relates to a polyester resin composition including a polyester resin including a diol residue and a dicarboxylic acid residue, wherein the diol residue includes a cyclohexanedimethanol residue and the dicarboxylic acid residue includes an isophthalic acid residue and a terephthalic acid residue, wherein an amount of the isophthalic acid residue is 0 to 20 mol % when a total amount of the dicarboxylic acid residue is considered as 100 mol %, wherein an amount of the cyclohexanedimethanol residue is 50 to 100 mol % when a total amount of the diol residue is considered as 100 mol %, wherein the polyester resin composition includes an antioxidant, and wherein the antioxidant includes a phenol-based antioxidant, a phosphorus-based antioxidant, and a sulfur-based antioxidant.

7 Claims, No Drawings

POLYESTER RESIN COMPOSITION, POLYESTER FILM, AND LAMINATE FOR ELECTRONIC DEVICE

CROSS-REFERENCE TO RELATED APPLICATIONS

This application claims the benefit under 35 U.S.C. 119(a) of Korean Patent Application No. 10-2021-0084559 filed on Jun. 29, 2021 in the Korean Intellectual Property Office, the entire disclosure of which is incorporated herein by reference for all purposes.

BACKGROUND

1. Field

The present disclosure relates to a polyester film having improved oxidation stability and durability including one or more of antioxidants as an additive, a manufacturing method of the same, and the like.

2. Description of Related Art

Recently, metal materials are being substituted with plastic materials for weight reduction of automobiles. However, plastic materials used in such a component of automobiles are required to have high temperature stability, and the slimming down of the materials are also required for volume reduction. Among such electronic device components for automobiles, Flexible Flat Cable (FFC) is one type of connection cables used for connecting PCB (Printed Circuit Board) or PBA (Printed Board Assembly) and has a relatively small size and a thin thickness compared to an ordinary connector. In addition, such an FFC has flexibility for being folded, and is thereby widely used as a connector inside an electric device such as a cellular phone.

SUMMARY

In a general aspect, a polyester resin composition according to one embodiment of the present disclosure includes a polyester resin including a diol residue and a dicarboxylic acid residue, wherein the diol residue includes a cyclohexanedimethanol residue and the dicarboxylic acid residue includes an isophthalic acid residue and a terephthalic acid residue, wherein an amount of the isophthalic acid residue is 0 to 20 mol % when a total amount of the dicarboxylic acid residue is considered as 100 mol %, wherein an amount of the cyclohexanedimethanol residue is 50 to 100 mol % when a total amount of the diol residue is considered as 100 mol %, wherein the polyester resin composition includes an antioxidant, and wherein the antioxidant includes a phenol-based antioxidant, a phosphorus-based antioxidant, and a sulfur-based antioxidant.

The sulfur-based antioxidant may be included in an amount of 30 parts by weight or more based on 100 parts by weight of the phenol-based antioxidant.

The phosphorus-based antioxidant and the sulfur-based antioxidant may be included in a weight ratio of 1:0.1 to 4.

The phosphorus-based antioxidant and the phenol-based antioxidant may be included in a weight ratio of 1:0.1 to 4.

The resin may further include a residual catalyst.

The residual catalyst may include a titanium.

The phosphorus-based antioxidant may include 3,9-bis(2,4-dicumylphenoxy)-2,4,8,10-tetraoxa-3,9-diiphosphaspyro[5.5]undecane.

A polyester film according to another embodiment of the present disclosure includes a polyester resin including a diol residue and a dicarboxylic acid residue, wherein the diol residue includes a cyclohexanedimethanol residue and the dicarboxylic acid residue includes an isophthalic acid residue and a terephthalic acid residue, wherein an amount of the isophthalic acid residue is 0 to 20 mol % when a total amount of the dicarboxylic acid residue is considered as 100 mol %, wherein an amount of the cycloheanedimethanol residue is 50 to 100 mol % when a total amount of the diol residue is considered as 100 mol %, wherein the polyester film includes an antioxidant, wherein the antioxidant includes a phenol-based antioxidant, a phosphorus-based antioxidant, and a sulfur-based antioxidant, and wherein a durability index (unit: /%) of the polyester film calculated from Equation 1 below may be 1 or less:

$$\text{Durability Index } (/\%) = \Delta YI \ast 10 / \Delta IV \, (\%) \quad [\text{Equation 1}]$$

where, in Equation 1, $\Delta YI$ is a variation of yellow index before and after the polyester film is left for 60 minutes in an oven under a condition of 250° C., and $\Delta IV$ (%) is a ratio of intrinsic viscosity of the polyester film after a treatment of being left for 60 minutes in an oven of 250° C. expressed as % of intrinsic viscosity of the polyester film before the treatment.

The variation of yellow index may be less than 5.

The ratio of the intrinsic viscosity of the polyester film after a treatment of being left for 60 minutes in an oven of 250° C. expressed as % of intrinsic viscosity of the polyester film before the treatment may be 85% or more.

Based on an amount of the phosphorus-based antioxidant and degradation products thereof, an amount of the sulfur-based antioxidant may be two times or less.

The durability index may be 0.1 to 0.5/%.

The sulfur-based antioxidant may be included in an amount of 30 parts by weight or more based on 100 parts by weight of the phenol-based antioxidant.

The phosphorus-based antioxidant and the sulfur-based antioxidant may be included in a weight ratio of 1:0.1 to 4.

The phosphorus-based antioxidant and the phenol-based antioxidant may be included in a weight ratio of 1:0.1 to 4.

The resin may further include a residual catalyst.

The residual catalyst may include a titanium.

The phosphorus-based antioxidant may include 3,9-bis(2,4-dicumylphenoxy)-2,4,8,10-tetraoxa-3,9-diiphosphaspyro[5.5]undecane.

A laminate for an electronic device according to another embodiment of the present disclosure includes: one or more electronically conductive layers; and an insulating layer disposed with covering at least some of the one or more electronically conductive layers, wherein the insulating layer includes the polyester film described above.

The laminate may be a flexible flat cable.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of this disclosure. For example, the sequences of operations described herein are merely examples, and are not limited to those set forth herein, but may be changed as will be apparent after an understanding of this disclosure, with the exception of operations necessarily occurring in a certain order. Also, descriptions of features that are known in the art may be omitted for increased clarity and conciseness.

In this application, the phrase that a certain element "comprises" or "includes" another element means that the certain element may further include one or more other elements but does not preclude the presence or addition of one or more other elements, unless stated to the contrary.

In this disclosure, when an element is referred to as being "connected" to another element, it can be understood not only as a case of a certain element directly connected to the other element but also as a case of having other elements interposed therebetween.

In this disclosure, "B being placed on A" means that B is placed in direct contact with A or placed over A with another layer or structure interposed therebetween and thus should not be interpreted as being limited to B being placed in direct contact with A.

In this disclosure, the phrase "combination(s) thereof" included in a Markush-type expression denotes one or more mixtures or combinations selected from the group consisting of components stated in the Markush-type expression, that is, denotes one or more components selected from the group consisting of the components are included.

The unit of ppm referred to in the present disclosure without special comment is based on the weight.

PET (Polyethylene terephthalate) oriented film is used in the manufacture of FFC or the like. However, the PET oriented film itself has a limitation in the temperature for heat resistance, and thus utilization of a polyester oriented film is limited in FFC, which is applied to key components such as a power train for automobiles, and a component for controlling an engine, to which high heat resistance is required.

In addition, in the manufacture of PET oriented film, when a metallic polymerization catalyst (Ti, etc.) is applied, a thermal stabilizer is required to be applied together with excellent activity, and when a phosphorus-based compound as a thermal stabilizer is excessively added into a polymerization group, degradation of reactivity may occur. Accordingly, when a stabilizer in a sufficient amount is not added to the polymerization group, if a film manufactured with a polymerized resin is used at a high temperature, problems of color change, fracture, or the like may occur. Accordingly, it is required to provide a PET film improved in the oxidation stability and durability, simultaneously, as well as securing efficiency of synthesis.

The objective of the present disclosure is to provide a polyester film having improved oxidation stability and durability including one or more of antioxidants as an additive to the polyester film. The objective of the present disclosure is to provide a polyester film improved in durability and utilizable to manufacture of a laminate for an electronic device such as a flexible flat cable.

The polyester resin composition, the biaxial-oriented polyester film, and the like of the present disclosure may provide a polyester film improved in oxidation stability and durability. The present disclosure may be used to manufacture a flexible flat cable, which is exposed to repetitive heat, and may improve the durability thereof.

Hereinafter, the present disclosure will be described in further detail.

Polyester Resin Composition

In a general aspect, the polyester resin composition according to an embodiment includes a polyester resin and an antioxidant.

The polyester resin may be manufactured by a conventional polymerization method, having a diol residue and a dicarboxylic acid residue, and for example, may be manufactured by polymeric reaction in a presence of a metal-containing catalyst such as titanium and antimony.

The diol residue may comprise a cyclohexanedimethanol residue.

The polyester resin may comprise the cyclohexanedimethanol residue in an amount of 50 mol % or more, 70 mol % or more, 80 mol % or more, 85 mol % or more, 90 mol % or more, 95 mol % or more, or 98 mol % or more, when the entire diol residue is considered as 100 mol %. Additionally, the diol residue may be substantially composed of the cyclohexanedimethanol residue. When the cyclohexanedimethanol residue is comprised in the amount described above based on the diol residue, it is possible to provide a polyester resin improved further in the heat resistance and hydrolysis resistance.

The diol residue may further comprise an additional diol residue other than a cyclohexanedimethanol residue. At this time, the polyester resin may be a copolymerized polyester resin.

As the additional diol residue, ethylene glycol, 1,3-propanediol, 1,2-octanediol, 1,3-octanediol, 2,3-butanediol, 1,3-butanediol, 1,4-butanediol, 1,5-pentanediol, 2,2-dimethyl-1,3-propanediol (neopentyl glycol), 2-butyl-2-ethyl-1,3-propanediol, 2,2-diethyl-1,5-pentanediol, 2,4-diethyl-1,5-pentanediol, 3-methyl-1,5-pentanediol, 1,1-dimethyl-1,5-pentanediol, or a mixture thereof may be used.

The dicarboxylic acid residue may comprise an isophthalic acid residue and a terephthalic residue. The amount of the isophthalic acid residue may be 20 mol % or less, 15 mol % or less, or 10 mol % or less, when the entire dicarboxylic acid residue is considered as 100 mol %. The amount of the isophthalic acid may be 0 mol % or more, 5 mol % or more, or 10 mol % or more.

The amount of the terephthalic acid residue may be 80 mol % or more, 90 mol % or more, 95 mol % or more, or 100 mol % or less, when the entire dicarboxylic acid residue is considered as 100 mol %.

When the isophthalic acid residue and the terephthalic acid residue are comprised in the amount described above based on the dicarboxylic acid residue, a relatively high melting point and a characteristic of low crystallization may be achieved.

As the dicarboxylic acid residue, one or more selected from the group consisting of aromatic dicarboxylic acid residues such as dimethylterephthalic acid, naphthalenedicarboxylic acid, and orthophthalic acid; aliphatic dicarboxylic acid residues such as adipic acid, azelaic acid, sebacic acid, decanedicarboxylic acid; alicyclic dicarboxylic residues; and esterification products thereof.

The polyester resin may comprise 1,4-cyclohexanedimethylene terephthalate residue and 1,4-cyclohexanedimethyleneisophthalate residue as repeating units. The polyester resin may comprise poly(1,4-cyclohexylenedimethylene-terephthalate-co-isophthalate) (PCTA) resin.

The polyester resin may have a weight average molecular weight (Mw) of 30,000 g/mol to 50,000 g/mol, or 30,000 g/mol to 40,000 g/mol.

Any conventional method of synthesizing a polyester resin may be used for the synthesis of the polyester resin without limitation. In detail, after a monomer including a dicarboxylic acid residue and a monomer including a diol residue are mixed, esterification reaction or condensation reaction may be performed to complete the synthesis of the polyester resin. At this time, a catalyst may be added to improve the reaction efficiency. The catalyst may be a titanium-based catalyst, an antimony-based catalyst, or the like, but not limited thereto.

The titanium-based catalyst may comprise titanium tetraisopropoxide.

For example, an antioxidant may be used for the synthesis of the polyester resin. The antioxidant may be used as needed to suppress thermal oxidation at a temperature of about 275° C., at which esterification reaction proceeds. However, the antioxidant is used in only certain amounts in ordinary cases. This is because, when excessive amount of the antioxidant is used, the polymerization reaction itself may be retarded and degradation of intrinsic viscosity of the manufactured resin may occur in many cases. Accordingly, the antioxidant affecting the synthesis of a polyester resin is consumed in the synthesizing process, and adding an antioxidant in an excessive amount, which may affect extrusion of a film, is practically difficult. Accordingly, the antioxidant added to the polyester resin composition for antioxidation during the manufacture of the film is substantially distinguished from the antioxidant used in the synthesis process of the resin.

The synthesized polyester resin may be kept in a shape of a chip, and subsequently may be utilized in the manufacture of a polyester film.

The kept polyester resin may pass through a drying process before the manufacture of a film, and the drying may proceed at a temperature of 150° C. or less, and may proceed in an atmosphere of 70 to 148° C. The drying may be performed for the dried polyester resin to have a moisture amount of 100 ppm or less. Preferably, the dried polyester resin may have a moisture amount of 50 ppm or less. When the drying process proceeds at a temperature of more than 150° C., there is a concern of causing an undesired color change in the polyester resin itself.

The antioxidant is comprised in the composition for manufacturing a polyester film together with the synthesized polyester resin.

The antioxidant is used to suppress undesired side reaction in ordinary chemical reaction, and may be applied in synthesis processes of resins in many cases.

The embodiment applies an antioxidant to the resin, whose synthesis has been already completed, and improves oxidation stability and durability not only in a film-making process, but also in the process of using the film. For the above objective, the embodiment applies at least three types of antioxidants.

The antioxidant comprises a phenol-based antioxidant, a phosphorus-based antioxidant, and a sulfur-based antioxidant.

The phenol-based antioxidant may be for example, selected from the group consisting of tetrakis[methylene-3-(3,5-di-tert-butyl-4-hydroxyphenyl)propionate]methane; octadecyl-3-(3,5-di-tert-butyl-4-hydroxyphenyl)propionate; Benzenepropanoic acid, 3,5-bis(1,1-dimethylethyl)-4-hydroxy, alkyl ester (alkyl has 7 or 9 carbon atoms); triethylene glycol-bis-3-(3-tert-butyl-4-hydroxy-5-methylphenyl)propionate; tris(3,5-di-tert-butyl-4-hydroxybenzyl)isocyanurate; 1,3,5-trimethyl-2,4,6-tris(3,5-di-tert-butyl-4-hydroxybenzyl)benzene; and a combination thereof.

The phosphorus-based antioxidant may be for example, selected from the group consisting of 3,9-bis (2,4-dicumylphenoxy)-2,4,8,10-tetraoxa-3,9-diphosphaspiro [5.5]undecane [3,9-Bis(2,4-dicumylphenoxy)-2,4,8,10-tetraoxa-3,9-diphosphaspiro[5.5]undecane]; bis(2,6-di-tert-butyl-4-methylphenyl)pentaerythritol-di-phosphite; bis(2,4-di-tert-butylphenyl)pentaerythritol-di-phosphite; Tetrakis (2,4-di-tert-butylphenyl) 4,4'-biphenylene diphosphonate; and a combination thereof.

The sulfur-based antioxidant may be for example, selected from the group consisting of dilauryl-3,3'-thiodipropionic acid ester; dimyristyl-3,3'-thiodipropionic acid ester; distearyl-3,3'-thiodipropionic acid ester; lauryl stearyl-3,3'-thiodipropionic acid ester; Pentaerythrityl tetrakis (3-laurylthio propion ester); and a combination thereof.

The antioxidant is comprised in the composition for manufacturing the film.

At least three types of antioxidants described above may be used together.

The phenol-based antioxidant may be comprised in an amount of 0.01 to 1 parts by weight based on the polyester resin of 100 parts by weight.

The phosphorus-based antioxidant may be comprised in an amount of 0.01 to 1 parts by weight based on the polyester resin of 100 parts by weight.

The sulfur-based antioxidant may be comprised in an amount of 0.01 to 1 parts by weight based on the polyester resin of 100 parts by weight.

The sulfur-based antioxidant may be comprised in an amount of 30 parts by weight or more based on the phenol-based antioxidant of 100 parts by weight.

The antioxidant may comprise the phosphorus-based antioxidant and the sulfur-based antioxidant in a weight ratio of 1:0.1 to 4, a weight ratio of 1:0.4 to 2.2, or a weight ratio of 0.8 to 1.2.

The antioxidant may comprise the phosphorus-based antioxidant and the phenol-based antioxidant in a weight ratio of 1:0.1 to 4, or a weight ratio of 0.3 to 1.2.

When the at least three types of antioxidants are applied together in the amount or the amount ratio as described above during the operation of film manufacture, fracture of a film does not occur even after stress treatment for about 60 minutes in an oven at about 250° C., a characteristic of yellow index variation or intrinsic viscosity variation is excellent, and excellent durability index, which evaluates overall properties for the above characteristics, may be achieved.

That is, when the antioxidant is applied to a composition for manufacturing a film, not to a process of synthesizing a resin, not only a basic function of an antioxidant, which is suppressing unnecessary side reaction in a film formation process, but also additional advantages of suppressing aging of a film, which is caused by an exposure to harsh environment during use of the film including repetitive addition of heats, may be achieved. Also, such characteristics may allow the polyester film to be used as an excellent insulting material for an electronic component such as a flexible flat cable.

The polyester resin composition may further comprise an electrostatic agent.

As the electrostatic agent, a salt of alkali metal or a salt of alkaline earth metal may be used, and may contribute sheet-making process of an extruded resin in a process of film manufacture. For example, a magnesium-based compound or a potassium-based compound, and specifically, magnesium acetate, potassium acetate, or a mixture thereof may be used as the electrostatic agent.

The electrostatic agent may be comprised in an amount of 300 to 1000 ppm based on the polyester resin of 100 parts by weight.

The electrostatic agent may be applied as a mixture of magnesium acetate and potassium acetate. The mixture may comprise magnesium and potassium in an amount ratio (mole ratio) of 1:1 to 10, or 1:5 to 10. In such a range, it is possible to provide a film sufficiently performing a function of an electrostatic agent and simultaneously improved in the durability because interaction with other additives is substantially suppressed.

Polyester Film

In a general aspect, a polyester film according to an embodiment comprises a polyester resin; and an antioxidant or a reactant thereof; and a durability index (unit: /%) expressed by Equation 1 below of the polyester film is 1 /% or less:

$$\text{Durability Index (/\%)} = \Delta YI * 10 / \Delta IV \text{ (\%)} \quad \text{[Equation 1]}$$

where, in Equation 1, $\Delta YI$ is a variation of yellow index before and after the polyester film is left for 60 minutes in an oven under a condition of 250° C., and $\Delta IV$ (%) is a ratio of intrinsic viscosity of the polyester film after a treatment of being left for 60 minutes in an oven of 250° C. expressed as % based on the intrinsic viscosity of the polyester film before the treatment.

The polyester film may have improved heat resistance and durability, and has a variation of yellow index or a variation of intrinsic viscosity controlled in a stress test as one of characteristics thereof.

The durability index may be more than 0 /% and 1 /% or less, 0.1 /% to 0.5 /%, or 0.12 /% to 0.32 /%. In such a range, it is possible to provide a polyester film improved in the heat resistance and durability in addition to substantially suppressing the occurrence of fracture of the film.

The difference of yellow index before and after being left for 60 minutes in an oven of 250° C. may be less than 5, 4 or less, 3 or less, more than 0.5, or more than 1. Such a difference of yellow index of the polyester film means that heat resistance thereof is improved, and particularly, when a metal-containing catalyst such as titanium-containing catalyst is used. Especially, considering that the metal-containing catalyst such as titanium-containing catalyst shows strong catalytic activity, the above difference of yellow index may be considered as an excellent result.

The polyester film may have the ratio of intrinsic viscosity of 85% or more, 90% or more, 92% or more, or 93% or more, which is a ratio of intrinsic viscosity of the polyester film expressed as % after being left for 60 minutes in an oven of 250° C. based on the intrinsic viscosity of the polyester film before the treatment. The variation of intrinsic viscosity may be less than 100%, 98% or less, or 96% or less. Such a high variation of intrinsic viscosity of the polyester film means durability thereof is improved. Especially, considering that the metal-containing catalyst such as titanium-containing catalyst shows strong catalytic activity, the above variation of intrinsic viscosity may be considered as an excellent result.

The polyester film also has a characteristic of not causing fracture even after a stress test, which leaves the film for 60 minutes in an oven at 250° C. The test of fracture is based on an evaluation by naked eye for checking whether a sample after the stress test is broken when folded in about 90 degrees.

The polyester film comprises a polyester resin having a diol residue and a dicarboxylic acid residue, wherein the diol residue comprises a cyclohexanedimethanol residue, and the dicarboxylic acid residue comprises an isophthalic acid residue and a terephthalic acid residue.

The amount of the isophthalic acid may be 0 to 20 mol %, when the entire dicarboxylic acid residue is considered as 100 mol %, and the amount of the cyclohexanedimethanol may be 50 to 100 mol %, when the entire diol residue is considered as 100 mol %.

The detailed description of the diol residue, the dicarboxylic acid residue, and the like is overlapped with the above description and thus the further description is omitted.

The polyester film comprises an antioxidant and a reactant thereof.

The antioxidant reacts to an energy added from the external, such as heat and UV light, before the resin reacts to the energy, in a process of film manufacture or in the film after the manufacture, and functions as retarding the oxidation degree of the resin and suppressing aging thereof. In the embodiment, specific types of the antioxidant are used and certain amount of antioxidant was added, thereby further excellent durability may be obtained.

Three types of antioxidants are used together as the antioxidant, and for the example, amount, amount ratio, and the like of a phenol-based antioxidant, a phosphorus-based antioxidant, and a sulfur-based antioxidant, description thereof is overlapped with the above description and thus the further description is omitted.

The phenol-based antioxidant may be comprised in an amount of 0.01 to 1 parts by weight based on the polyester resin of 100 parts by weight. The phosphorus-based antioxidant may be comprised in an amount of 0.01 to 1 parts by weight based on the polyester resin of 100 parts by weight. The sulfur-based antioxidant may be comprised in an amount of 0.01 to 1 parts by weight based on the polyester resin of 100 parts by weight. The amount of the antioxidant may be calculated based on the sum of residual antioxidants and degradation products thereof.

The antioxidant may comprise the phosphorus-based antioxidant and the sulfur antioxidant in a weight ratio of 1:0.1 to 4, a weight ratio of 1:0.4 to 2.2, or a weight ratio of 1:0.8 to 1.2.

The antioxidant may comprise the phosphorus-based antioxidant and the phenol-based antioxidant in a weight ratio of 1:0.1 to 4, or a weight ratio of 0.3 to 1.2.

When the at least three types of antioxidants in the amount or the amount ratio are applied together in an operation of film manufacture, fracture of a film does not occur even after stress treatment for the manufactured film for 60 minutes in an oven at about 250° C. with an air atmosphere, the characteristic of a variation of yellow index or a variation of intrinsic viscosity is excellent, and excellent durability index, which evaluates overall properties for the above characteristics, may be achieved.

A difference may occur between the amount of an antioxidant added into a polyester resin composition and the amount of the antioxidant measured in the manufactured polyester film. This is because the antioxidant itself may easily be degraded, as described above. Particularly, in the case of a sulfur-based antioxidant, the degradation products may be removed as a gas form. Accordingly, the sulfur-based antioxidant may be detected in a weight ratio of two times or less from the polyester film, based on the phosphorus-based antioxidant and the degradation products thereof.

The polyester film may be used as an insulting layer for covering an electronically conductive layer, and can maintain comparatively stable properties for a long time, even after exposed to repetitive high heat applied to the electronically conductive layer.

Hereinafter, the manufacturing method of the polyester film will be described.

The manufacturing method of the polyester film may comprise a sheet-forming operation of extruding a polyester resin composition comprising a polyester resin, in which diol and dicarboxylic acid have been polymerized, and forming a sheet; and a stretching operation of stretching the sheet in a length direction and a width direction and thermally fixing the stretched sheet.

The polyester resin comprised in the polyester resin composition may be dried. The drying is performed before the extruding process. The temperature of drying is preferably 150° C. or less for preventing color change. The extrusion may be performed under the temperature condition of 230° C. to 300° C., or 250° C. to 290° C.

The stretching is applied after preheating. The preheating may be in a temperature range of satisfying Tg+5° C. to Tg+50° C. based on the glass transition temperature (Tg) of the polyester resin, for example, in a range of 70° C. to 90° C. In such a case, the polyester film can secure flexibility needed in stretching and can suppress a fracture in the stretching process.

The stretching may be performed by biaxial stretching. For example, it may be stretched in two axes of the length direction (mechanical direction MD) and the width direction (tenter direction TD) through a simultaneous biaxial stretching method or an axis retardation biaxial stretching method. Preferably, the axis retardation biaxial stretching method, which operates stretching in one direction first and subsequently operates stretching in the right angle direction thereof, may be performed.

The stretching ratio in the length direction may be 2.0 to 5.0, or 3.0 to 3.5. Also, the stretching ratio in the width direction may be 2.0 to 5.0, or 3.7 to 4.1. The ratio of the stretching ratio in the length direction (d2) with respect to the stretching ratio in the width direction (d1) (d2/d1) may be 0.9 to 1.4, or 1.1 to 1.3. The stretching ratio (d1 and d2) refers to a length after stretching, when the length before the stretching is designated as 1.0.

The speed of the stretching may be 6.5 m/min to 8.5 m/min, but is not specially limited thereto.

The stretched sheet may be thermally fixed, and a temperature for thermal fixing may be 150° C. to 250° C., and specifically, may be 235° C. to 245° C. The thermal fixing may be performed for 5 seconds to 10 minutes, and more specifically, may be performed for 10 seconds to 7 minutes.

After the thermal fixing is started, the film may be relaxed in the length direction and/or the width direction, and the temperature range at this time may be 150° C. to 250° C., and specifically, 235° C. to 245° C. The thermal fixing may be performed for 5 seconds to 10 minutes, and more specifically, may be performed for 10 seconds to 7 minutes.

After thermal fixing is started, the film may be relaxed in the length direction and/or the width direction, at this time, the temperature range may be 150° C. to 250° C., and the relaxing rate may be 1% to 10%, or 3% to 7%.

The thickness of a polyester film may be 1 μm to 1,000 μm, or 10 μm to 500 μm.

Laminate for Electronic Device Such as Flexible Flat Cable

In a general aspect, a laminate for an electronic device according to an embodiment has a multilayer structure, and comprises one or more electronically conductive layer; and an insulating layer disposed with covering at least some of the electronically conductive layer.

The insulating layer may comprise a polyester film described as above.

The electronically conductive layer may be, for example, copper, silver, platinum, an electronically conductive polymer, or a mixture thereof, and may be in a wire form or a thin film form. For example, a copper wire may be applied, but the material is not limited thereto.

The laminate for an electronic device may be manufactured by disposing an electronically conductive layer on a first insulating layer, disposing a second insulating layer thereon, and subsequently laminating them. Through the lamination, the first insulating layer and the second insulating layer may be indistinguishable from each other, covering an electronically conductive layer.

The first insulating layer and the second insulating layer may comprise the polyester film, respectively, and for example, the polyester film may directly contact the electronically conductive layer.

The polyester film has improved oxidation resistance and durability and thus may be excellently used as an insulating layer of FFC applied in key components such as a power train and a component for controlling an engine, to which high temperature stability is required.

Hereinafter, the detailed embodiments will be described in further detail. The example embodiments below are no more than examples, and the scope of the present disclosure is not limited thereto.

1) Manufacture of Polyester Resin

A monomer mixture with cyclohexanedimethanol (CHDM) as diol of 100 mol %, terephthalic acid (TPA) as dicarboxylic acid of 95 mol %, and isophthalic acid (IPA) of 5 mol % was put into a stirrer, Ti catalyst was added in the amount of 0.001 parts by weight based on the monomer mixture of 100 parts by weight, and after that ester exchange reaction was performed at 275° C. The reactant was transferred to a separate reactor equipped with vacuum equipment, subsequently polymerized for 160 minutes at 285° C., and thereby polycyclohexylene dimethylene terephthalic acid (PCTA) was obtained. The resin was dried under the temperature of 150° C. or less and, after that, applied to subsequent process. The polycyclohexylene dimethylene terephthalic acid manufactured in this manner is referred as the resin. The resin was applied as resins in Examples 1 to 4 and Comparative Examples 1 and 2 below.

2) Manufacture of Biaxial-oriented Polyester Film

Irganox 1010 available from BASF corporation was applied as a phenol-based antioxidant.

Doverphos S9228 available from DOVER corporation was applied as a phosphorus-based antioxidant.

A0-412S available from ADEKA corporation was applied as a sulfur-based antioxidant.

Example 1

As shown in Table 1 below, a phenol-based antioxidant of 500 ppm, a phosphorus-based antioxidant of 1000 ppm, and a sulfur-based antioxidant of 100 ppm as antioxidants of total 2500 ppm were added to the resin, an electrostatic agent of 400 ppm based on the metal (metal atoms and metal ions are included) amount of a final film was added to the resin and put into an extruder, the resin was extruded at about 290° C. and casted by a casting roll at about 20° C., and thereby a sheet was formed. After preheated, the sheet was stretched in a length direction (MD) and a width direction (TD). Thereafter, the stretched sheet was thermally fixed for about 30 seconds and relaxed, thereby manufacturing respective polyester films. The stretching ratio, thermal fixing temperature, and the like were listed in Table 1 below.

Examples 2 to 4 and Comparative Examples 1 to 3

While other conditions were the same as Example 1, by applying the amount and composition according to [Table 1], respective polyester films of Examples 2 to 4 and Comparative Examples of 1 to 2 were manufactured.

TABLE 1

| | Antioxidant (ppm) | | | | Electrostatic agent (ppm) | Stretching Ratio (MD*TD) | Thermally Fixing Temperature ° C. |
|---|---|---|---|---|---|---|---|
| | Primary (Phenol-based) | Secondary (Phosphorus-based) | Sulfur-based | Total Amount | | | |
| Example 1 | 500 | 1000 | 1000 | 2500 | 400* | 3.2 × 3.9 | 240 |
| Example 2 | 1000 | 500 | 1000 | 2500 | 400** | 3.2 × 3.9 | 240 |
| Example 3 | 1000 | 1000 | 500 | 2500 | 400 | 3.2 × 3.9 | 240 |
| Example 4 | 1000 | 1000 | 1000 | 3000 | 400 | 3.2 × 3.9 | 240 |
| Comparative Example 1 | 1000 | 1000 | 0 | 2000 | 400 | 3.2 × 3.9 | 240 |
| Comparative Example 2 | 0 | 0 | 0 | 0 | 400 | 3.2 × 3.9 | 240 |

*The electrostatic agent of Example 1 was applied by mixing potassium acetate and magnesium acetate in the mole ratio of 5:1.
*The electrostatic agent of Example 2 was applied by mixing potassium acetate and magnesium acetate in the mole ratio of 9:1.
*The electrostatic agents of Examples 3 and 4 and Comparative Examples 1 and 2 were respectively applied by magnesium acetate.

3) Property Evaluation of Biaxial-Oriented Polyester Film
Evaluation for Color Change The manufactured biaxial-oriented polyester film was cut into the size of 100 mm×100 mm and left for 60 minutes in an oven under the condition of 250° C. (hereinafter, referred as oven treatment), and, after that, the variation of YI value was shown in Table 2 as ΔYI.

ΔYI showed the difference between a YI value before oven treatment and a YI value after the oven treatment.

Evaluation for Fracture

Whether the film was fractured was also evaluated by the same manner as the evaluation for color change. Thermal treatment was performed to the film with an oven and cooling was performed to room temperature. After that, when the film was folded in about 90 degrees, whether fracture occurs was evaluated by naked eyes and the result was shown in Table 2 below.

Evaluation for IV Variation

Intrinsic viscosity (IV dL/g) variation (ΔIV) of the manufactured film was measured for IV before/after left in an oven by cutting a film, keeping the film for 60 minutes in an oven and retrieving it. In order to obtain IV of the film, each film (10 mg) was dissolved into ortho-chlorophenol of 100° C., after that the fall time of each sample was obtained by Ostwald viscosity meter in a constant-temperature bath of 35° C., and thereby relative viscosity was measured. The obtained relative viscosity was converted into intrinsic viscosity (IV) in accordance with a conversion table of relative viscosity-intrinsic viscosity.

ΔIV shows the ratio an IV value after the oven treatment based on an IV value before oven treatment.

Evaluation for Durability Index

The durability index of each film in consideration of both variations of intrinsic viscosity and yellow index was shown in Table 2 below. The durability index was calculated by Equation 1 below:

$$\text{Durability Index } (/\%) = \Delta YI * 10 / \Delta IV (\%) \qquad \text{[Equation 1]}$$

TABLE 2

| | ΔYI | Fracture | ΔIV (%) | Durability Index |
|---|---|---|---|---|
| Example 1 | 1.8 | X | 91 | 0.20 |
| Example 2 | 2.84 | X | 92 | 0.31 |
| Example 3 | 3.01 | X | 90 | 0.33 |
| Example 4 | 2.84 | X | 94 | 0.30 |
| Comparative Example 1 | 14 | ○ | 77 | 1.82 |
| Comparative Example 2 | 25 | ○ | 65 | 3.85 |

Referring to [Table 1] and [Table 2], in the case of Examples 1 to 4, in which a phenol-based antioxidant, a phosphorus-based antioxidant, and a sulfur-based antioxidant were added in a proper ratio to manufacture a biaxial-oriented polyester film, the color change (variation of YI and b values) was reduced and fracture was not observed by naked yes, compared to Comparative Examples 1 and 2, in which an antioxidant was not added or a sulfur-based antioxidant was added in a small amount. This result of suppressed fracture is thought to occur due to improvement in durability by a sulfur-based antioxidant added with phenol-based and phosphorus-based antioxidants together.

For maintaining durability in repetitive heating and cooling processes when a polyester film is used as an insulating material such as FFC, both of variation rates of yellow index and intrinsic viscosity have to be controlled. The durability index, which is introduced to evaluate this, was shown as being excellent in the cases of Examples. Particularly, Example 1 exhibited the lowest value, and therefore it was evaluated as simultaneously improving two characteristics of yellow index and intrinsic viscosity.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A polyester film comprising a synthesized polyester resin comprising a diol residue and a dicarboxylic acid residue,
wherein the diol residue comprises a cyclohexanedimethanol residue and the dicarboxylic acid residue comprises an isophthalic acid residue and a terephthalic acid residue,
wherein an amount of the isophthalic acid residue is more than 0 mol % and 20 mol % or less when a total amount of the dicarboxylic acid residue is considered as 100 mol %,
wherein an amount of the cyclohexanedimethanol residue is 50 to 100 mol % when a total amount of the diol residue is considered as 100 mol %,
wherein the polyester film further comprises an antioxidant applied to the synthesized polyester resin,
wherein the antioxidant comprises a phenol-based antioxidant, a phosphorus-based antioxidant, and a sulfur-based antioxidant,
wherein a durability index (unit:/%) of the polyester film calculated from Equation 1 below is 0.12/% to 0.32/%:

Durability Index(/%)=$\Delta YI*10/\Delta IV$ (%)  [Equation 1]

where, in Equation 1, $\Delta YI$ is a variation of yellow index before and after the polyester film is left for 60 minutes in an oven under a condition of 250° C., and $\Delta IV$ (%) is a ratio of intrinsic viscosity of the polyester film after a treatment of being left for 60 minutes in an oven of 250° C. expressed as % based on intrinsic viscosity of the polyester film before the treatment,
wherein the phosphorous-based antioxidant is selected from the group consisting of 3,9-bis (2,4-dicumylphenoxy)-2,4,8,10-tetraoxa-3,9-diphosphaspiro[5.5]undecane; tetrakis(2,4-di-tert-butylphenyl) 4,4'-biphenylene diphosphonate; and a combination thereof,
wherein the sulfur-based antioxidant is selected from the group consisting of dimyristyl-3,3'-thiodipropionic acid ester; distearyl-3,3'-thiodipropionic acid ester; lauryl stearyl-3,3'-thiodipropionic acid ester; pentaerythrityl tetrakis (3-laurylthio propion ester); and a combination thereof, and
wherein the phenol-based antioxidant is selected from the group consisting of tetrakis[methylene-3-(3,5-di-tert-butyl-4-hydroxyphenyl)propionate]methane; octadecyl-3-(3,5-di-tert-butyl-4-hydroxyphenyl)propionate; Benzenepropanoic acid, 3,5-bis(1,1-dimethylethyl)-4-hydroxy, alkyl ester (alkyl has 7 or 9 carbon atoms); triethylene glycol-bis-3-(3-tert-butyl-4-hydroxy-5-methylphenyl)propionate; tris(3,5-di-tert-butyl-4-hydroxybenzyl) isocyanurate; 1,3,5-trimethyl-2,4,6-tris(3,5-di-tert-butyl-4-hydroxybenzyl)benzene; and a combination thereof,
wherein the antioxidant comprises the phosphorus-based antioxidant and the sulfur-based antioxidant in a weight ratio of 1:0.8 to 1.2 and
wherein the polyester film further comprises an electrostatic agent in an amount of 300 to 1000 ppm based on the polyester resin of 100 parts by weight, and the electrostatic agent comprises a mixture of magnesium and potassium acetate.

2. The polyester film of claim 1, wherein the variation of yellow index is less than 5.

3. The polyester film of claim 1, wherein the ratio of the intrinsic viscosity of the polyester film after a treatment of being left for 60 minutes in an oven of 250° C. expressed as % based on the intrinsic viscosity of the polyester film before the treatment is 85% or more.

4. The polyester film of claim 1, wherein the sulfur-based antioxidant is comprised in an amount of 30 parts by weight or more based on 100 parts by weight of the phenol-based antioxidant,
and
wherein the phosphorus-based antioxidant and the phenol-based antioxidant are comprised in a weight ratio of 1:0.1 to 4.

5. The polyester film of claim 1, further comprising a residual catalyst.

6. The polyester film of claim 5, wherein the residual catalyst is a titanium.

7. The polyester film of claim 1,
wherein the mixture contains a magnesium and potassium in an amount ratio (mole ratio) of 1:1 to 1:10.

* * * * *